(12) United States Patent
Espensen (10) Patent No.: US 10,606,058 B2
(45) Date of Patent: Mar. 31, 2020

(54) MICROSCOPE SLIDE FOR LIQUID CULTURES

(71) Applicant: Carol Lynn Espensen, San Antonio, TX (US)

(72) Inventor: Carol Lynn Espensen, San Antonio, TX (US)

( * ) Notice: Subject to any disclaimer, the term of this patent is extended or adjusted under 35 U.S.C. 154(b) by 148 days.

(21) Appl. No.: 15/868,772

(22) Filed: Jan. 11, 2018

(65) Prior Publication Data

US 2019/0212540 A1 Jul. 11, 2019

(51) Int. Cl.
*G02B 21/34* (2006.01)
(52) U.S. Cl.
CPC .................................. *G02B 21/34* (2013.01)
(58) Field of Classification Search
CPC ......... G01C 3/04; G01S 17/08; G01S 7/4812; G02B 23/04; G02B 23/10; G02B 23/18; G02B 5/04; G02B 7/06; G02B 21/34; G01N 2035/00138; G01N 21/01; G01N 33/49; B01L 2300/0822; B01L 3/5085; B01L 2200/027; B01L 2200/0642; B01L 2300/0609; B01L 2300/0829
See application file for complete search history.

(56) References Cited

U.S. PATENT DOCUMENTS

| | | | |
|---|---|---|---|
| 3,447,863 A | 6/1969 | Patterson | |
| 3,551,023 A | 12/1970 | Brackett | |
| 3,829,216 A * | 8/1974 | Persidsky | G02B 21/34 356/36 |
| 3,961,346 A | 6/1976 | White | |
| 4,022,521 A | 5/1977 | Hall | |
| 4,299,441 A | 11/1981 | Parker | |
| 4,505,557 A | 3/1985 | Golias | |
| 4,722,598 A * | 2/1988 | Ford | G02B 21/34 356/246 |
| 5,021,294 A * | 6/1991 | Karasawa | G02B 21/34 428/332 |
| 5,939,251 A * | 8/1999 | Hu | B01L 3/508 435/288.3 |
| 6,358,475 B1 | 3/2002 | Berndt | |
| 2001/0050810 A1 * | 12/2001 | Lorincz | G01N 1/30 359/396 |
| 2007/0166780 A1 * | 7/2007 | Wilson | A61K 31/407 435/34 |

(Continued)

*Primary Examiner* — William R Alexander
*Assistant Examiner* — Balram T Parbadia (57) ABSTRACT

A specimen retaining method and slide apparatus for use with microscopes to view protozoans and similar organisms in liquid cultures. The slide assembly has a rigid rectangular base made of optically clear plastic, having a shallow well for holding the liquid culture, and a thin flexible coverslip of similar shape made of optically clear plastic placeable in the slide base to cover and retain the liquid. The base has a perimeter railing that holds the coverslip in place over the well and to prevent its disturbance when handled. The well is rectangular, oriented along the length of the base. Flat ledges extend inward from these railings to support the coverslip and to define the depth of the well. The well contains narrow ridges of height corresponding to the well depth with small liquid-distribution gaps along them to support the coverslip. These ridges constrain the specimen(s) in the liquid compartments.

11 Claims, 5 Drawing Sheets

(56) References Cited

U.S. PATENT DOCUMENTS

| | | | | |
|---|---|---|---|---|
| 2010/0151511 A1* | 6/2010 | Greenizen | ............ | B01L 3/5085 |
| | | | | 435/40.5 |
| 2014/0329300 A1* | 11/2014 | Lundt | ...................... | G01N 1/31 |
| | | | | 435/287.2 |
| 2018/0250670 A1* | 9/2018 | Le Berre | ................ | G01N 21/01 |

* cited by examiner

MICROSCOPE SLIDE FOR LIQUID CULTURES

BACKGROUND OF INVENTION

A common biological laboratory procedure is one involving examination and identification of microscopic single-cell organisms in the animal phylum Protozoa and the like. More than 30,000 protozoan species are known to exist and are divided into five classes based on their modes of locomotion and/or stationary condition. Such organisms live in fresh, brackish, or salt water or in moist organic debris or as parasites in the gut of larger animals. The living functions of a protozoan cell are performed by "organelles" which are pseudo or crude organs that execute the processes of locomotion, feeding, excretion, reproduction, and reaction to external stimuli. To observe, identify, and study protozoan organisms requires microscope magnification in the range of 40× to about 400×. For this purpose, the organisms of interest are cultivated in their normal habitat medium and the liquid cultures are transferred to a microscope stage for illuminated viewing. The liquid medium provides them with the nutrients necessary to live and to allow them to move about in normal routines.

To view such live and moving protozoans under microscope magnification, the liquid culture must be contained in a shallow reservoir that confines the protozoans to a liquid depth not much larger than the depth of field of the microscope and yet deep enough to allow the microscopic animals to move about freely in a normal way. The upper and lower parts of the reservoir must be optically clear to properly illuminate and view the protozoans and the culture medium must not contain an excess of bulk or suspended particles that can obscure the view. A variety of microscope slides have been developed to serve this purpose, with the simplest consisting of a two-component assembly comprising a glass slide with a shallow cavity ground into its upper surface and a cover glass, often referred to as a "coverslip", to cover and enclose the liquid medium within the cavity. Other more elaborate arrangements have been developed to provide one or more thin liquid cavity within a molded clear plastic body in which the culture liquid is introduced as droplets from a syringe or pipette and allowed to intrude into and fill the cavity or cavities by capillary action.

In reference to two-component slides, Hall (U.S. Pat. No. 4,022,521) discloses a two-component microscope slide for examining biological samples such as blood cells which are typically less than 0.0005 inch in largest dimension. The base slide and coverslip components are molded from clear plastic material. Small micron-size projections or "posts" are molded on the upper surface of the base slide and are located in the liquid viewing area between the upper and lower slide components to preserve a uniform depth dimension of the liquid layer limited to not more than 15 μm (0.0006 inch) thick and open on all four sides. The small posts are spaced widely apart to minimize any obstruction of blood cells being freely dispersed into the thin liquid layer space. Berndt (U.S. Pat. No. 6,358,475) discloses a two-component microscope slide also intended for examining blood cells while intentionally allowing the coverslip component to sag downward into the liquid layer as a result of the capillary attraction force of the contained liquid in the thin layer acting on the flexible coverslip, thereby causing a non-uniform liquid layer thickness with the result that more cells reside in the thicker parts of the layer. Brackett (U.S. Pat. No. 3,551,023) discloses a two-component microscope slide in which the specimen to be viewed (preferably a pathology specimen) is centrally positioned between the base slide and a coverslip separated by a thin perimeter of material adhered to the base slide. The open area containing the specimen can be smaller than the base slide to minimize sagging of the coverslip. The perimeter spacer material is a two-sided pressure-sensitive adhesive film that allows the coverslip to be affixed to the base slide to completely encase the specimen. While some degree of control of the specimen layer thickness is provided by the adhesive film, this slide configuration is not necessarily intended for precise sample layer thickness control. If used to contain a liquid culture sample, this slide arrangement would be found to be ineffective in being filled without entrapping air bubbles and would introduce uncertainty in properly sealing the edges of the coverslip. Patterson (U.S. Pat. No. 3,447,863) discloses a method for preparing a microscope slide for viewing biological specimens in a liquid medium giving priority attention to providing a uniform specimen layer thickness. In this patent, the specimen is held within a prescribed liquid layer thickness by means of micro-sized polymer beads of a predetermined spherical diameter mixed into the specimen liquid medium. Such polymer beads having substantially uniform diameter are commercially available in a variety of sizes. For static biological specimens the positions and spacings of the beads does not present a significant problem with microscope viewing. However, for observing moving protozoans of say 0.003 inch size in a liquid layer 0.010 inch thick, the beads will be more than three times larger than the target living organisms and, hence, where clusters of beads form in the liquid layer the specimens of interest may become easily obscured from view.

In reference to integrally molded cavity slides, Golias (U.S. Pat. No. 4,505,557) discloses a multiple-chamber microscope slide molded as a one-piece plastic assembly. In this patent, the optically clear plastic base slide and coverslip viewing panels comprising each chamber are molded as a combined integral unit with a liquid chamber therebetween open on two ends and having an available liquid layer thickness dimension of 0.010 inch. This arrangement is generally useful for microscopic examination of biological liquids but it is intricate in its three-dimensional geometry, particularly where very thin plastic coverslip panels and thin liquid chamber dimensions are required. The thin integrally molded chambers and coverslip panels forming the multiple chambers of this slide require special molding techniques that make the slide fabrication time consuming and expensive. Parker (U.S. Pat. No. 4,299,441) discloses an optically clear multiple-chamber plastic molded microscope slide having its upper and lower specimen view panels combined as an integral unit with an internal liquid chamber open on one side and having a liquid layer thickness of 0.004 inch to 0.008 inch and an upper plastic viewing panel ("coverslip") thickness of 0.013±0.002 inch. The internal cavity chambers having only one open side complicates the three-dimensional plastic molding process which, for thin plastic viewing panels and liquid layer cavity dimensions, can introduce inadvertent molding flaws or inaccurate dimensions in the multiple-chamber assembly. White (U.S. Pat. No. 3,961,346) discloses a liquid inspection slide for biological liquid specimens and cell cultures having thin specimen chambers open on one side molded in a unitary body of optically clear polymeric plastic material. The chambers are deliberately tapered in thickness at an angle of a few degrees resulting in a liquid layer thickness dimension ranging from about 0.005 inch on its closed end to about 0.015 inch on its open end. The plastic molding process prevents this layer thickness from being made smaller. However, the patent specifies that by applying pressure via small heated platens positioned on the coverslip and base slide panels the chamber thickness can be made noticeably smaller. Elkins (U.S. Pat. No. 3,777,283) discloses a microscope slide for liquid specimens having multiple thin liquid layer chambers molded in an integral clear plastic slide body. The liquid layer thickness is preferably 0.009 inch to 0.010 inch. The overall dimensions of this multi-chamber slide are 3 inches long by 1 inch wide by 0.0625 inch thick and has five individual specimen chambers approximately 0.375-inch wide. The plastic molding process for this slide demands skilled mold preparation and careful plastic injection control to produce accurate liquid chamber dimensions and thin chamber viewing panels without flaws. This patent is the forerunner to the more elaborate integrally molded microscope slide described above in Parker (U.S. Pat. No. 4,229,441).

Of particular concern in the prior art cited and described above is, in the two-component devices, the ability to readily achieve or use a very thin coverslip where emplaced rigidity is required to prevent sagging and, in the integrally molded devices, the complexity of the molding process required to achieve accurate dimensions and efficient production of the very thin walled three-dimensional cavity bodies. In particular, the thickness of the coverslip imposes a limitation on the degree of microscope magnification that can be used in viewing the protozoans in the liquid well or cavity. The optical path involves three different layers having different indices of refraction that can limit the microscope depth of field and focusing clarity of the objects being viewed. When the object is a live protozoan moving in the culture liquid layer, clear viewing can only be obtained under conventional conditions at magnifications up to about 40×. This degree of magnification does not permit detailed observation of the organelles and their internal functions within the cell body of small protozoans. However, common practice has shown that this magnification can be increased by a factor of two or three when using a standard microscope by placing a drop of oil between the closely spaced microscope objective lens and the coverslip to eliminate the air path. But no such improvements are possible when using digital microscopes that operate essentially in camera mode with a substantial air path. An alternative approach not requiring oil coupling is to make the coverslip thinner to minimize the intermediate plastic (or glass) segment of the optical path. This approach, although applicable to both optical and digital microscopes, has limitations because of the flexibility of a thin coverslip when required to maintain a uniform liquid layer thickness over a relatively wide span and in handling and emplacing such thin coverslip materials. In this alternative, however, only the coverslip component and not the base slide viewing panel must be made thin since the optical path associated with the microscope view is not significantly affected by the thickness of the base slide viewing panel. As another concern, molding plastic components that have a thin capillary liquid cavity and very thin viewing panels having the necessary microscope optical clarity for undistorted imaging is a demanding task requiring a high precision mold, skilled mold adjustments and readyness checking, and careful control of the plastic material injection process. Such demanding molding requirements and related quality control makes production of such three-dimensional cavity slide assemblies expensive and time consuming. For both types of liquid well microscope slides these requirements place a limit on the thinnest dimensions that can be achieved and used with reasonable production efficiency. Therefore, the liquid-culture microscope slide concepts and methodologies cited in the prior art limit the ability to magnify and observe with quantitative detail the many species of small protozoans of interest.

The microscope slide described hereinbelow circumvents the limitations concerning the relevant prior art by creating an improved two-component liquid-well slide configuration that facilitates the use of thin flexible plastic coverslips and requires straight-forward injection molding fabrication of only the plastic slide base component. This improved liquid-well slide assembly provides significant technical advantages in its manufacture and cost and important advances that allow the use of increased magnification for detailed observation and study of protozoans and other small cellular organisms.

BRIEF DESCRIPTION OF THE DRAWINGS

The following figures illustrate the general configuration of the liquid-well microscope slide assembly presented herein and further illustrate the embodiment of its specialized features in several arrangements for different microscope applications.

DETAILED DESCRIPTION OF THE INVENTION

The features and functions of the improved microscope slide assembly briefly described above are now presented in detail. The drawings, consisting of associated plan views and cross-sectional views, present useful information that is important in understanding the technical features of the invention and its variations in configuration that are relevant to certain specific microscope applications or for accommodating different sizes of protozoan species.

Figure 1A:
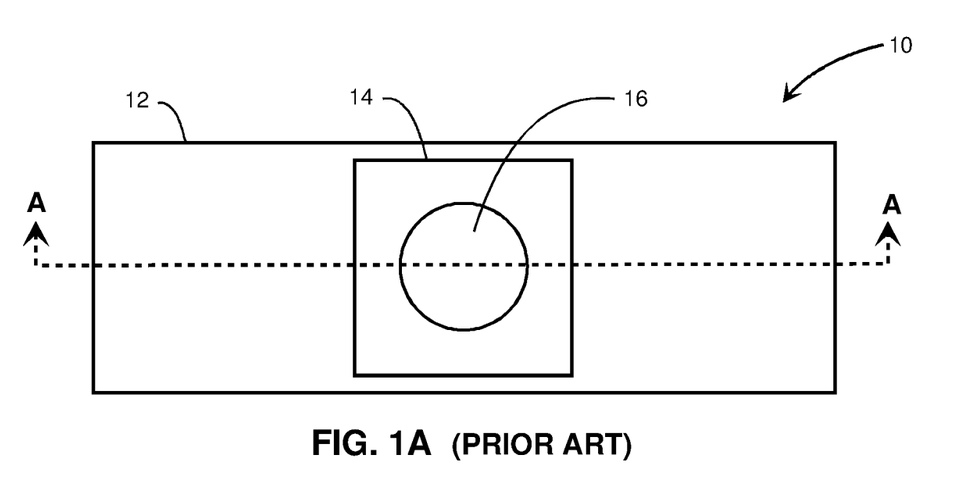
FIG. 1A illustrates a plan view of a two-component microscope slide assembly having a commonly available liquid-well slide base and a coverslip typical of the prior art.
Figure 1B:
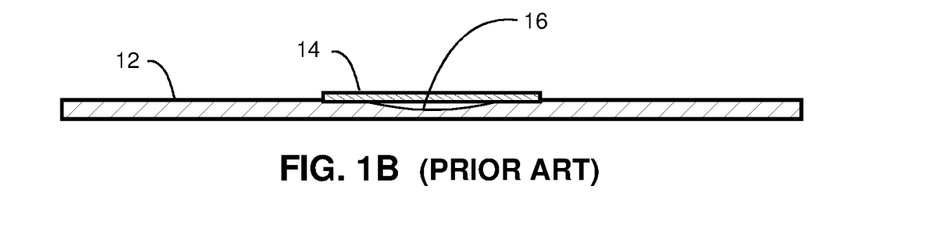
FIG. 1B illustrates an associated cross-sectional view of the assembly of FIG. 1A taken along line A-A.

The principal feature of the liquid-well microscope slide assembly is its ability to incorporate much thinner coverslips and thereby provide higher magnification when observing single cell organisms. To first clarify this feature, FIGS. 1A and 1B show a plan view and an associated cross-sectional view respectively of a conventional two-component liquid-well slide 10 typical of the prior art consisting of a base slide 12 and a coverslip 14 used to cover and retain the liquid culture and its live protozoans in well 16. The liquid well 16 is made large enough to accommodate and replicate the habitat environment of certain small to medium size protozoan species of interest and may include certain inert elements such as small filamentary fibers, nutrient particles, and possibly other particles suspended in the culture. For quantitative viewing of live protozoans under microscope magnification, the liquid layer is preferred to have a uniform depth rather than the spherically shaped well 16 shown in FIGS. 1A and 1B. Further, the well 16 must be shallow enough to keep the protozoans and other elements in the culture approximately within the microscope depth of field. The coverslip 14 must be rigid enough to resist sagging downward into the liquid well 16 and modifying the optical viewing path and possibly impeding the free swimming motions of the protozoans. The thickness dimension of the coverslip 14 governs its rigidity. Common practice has demonstrated that, for plastic materials, the coverslip 14 must be at least 0.01 in thick to uniformly cover a liquid well of 0.5 inch diameter without sagging. Larger liquid wells will require coverslips having a thickness in the range of 0.01 inch to 0.025 inch. If oil coupling is used with such plastic coverslips, the microscope objective lens may potentially impart a slight pressure on the coverslip to deform it downward into the liquid well. Without oil coupling, plastic coverslips having a thickness of 0.01 inch or greater limit the microscope magnification to about 40×. Plastic coverslips of this type are typically rigid enough to be handled and placed on the well slide base and are usually made smaller in size than the slide base to avoid slippage movements that may disturb its placement or introduce air bubbles into the liquid well when handling the assembly.

Figure 2A:
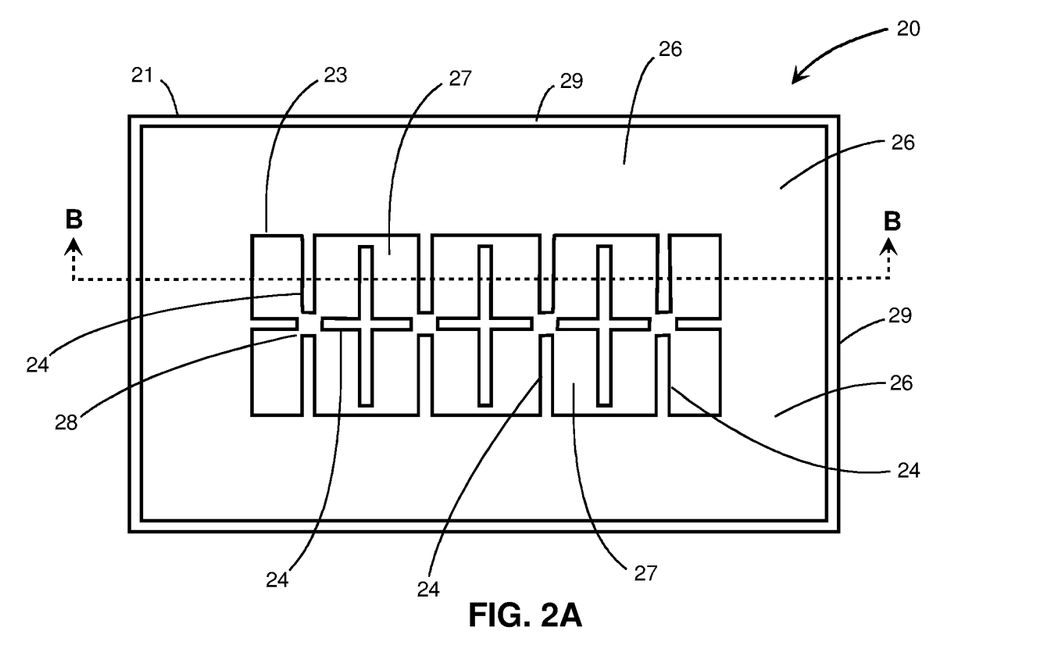
FIG. 2A shows a plan view of the improved two-component microscope slide assembly described in detail hereinbelow depicting its unique specialized features that facilitate convenient handling, accurate placement of the coverslip, and an internal array of narrow ridges that support the coverslip over the liquid well span.
Figure 2B:
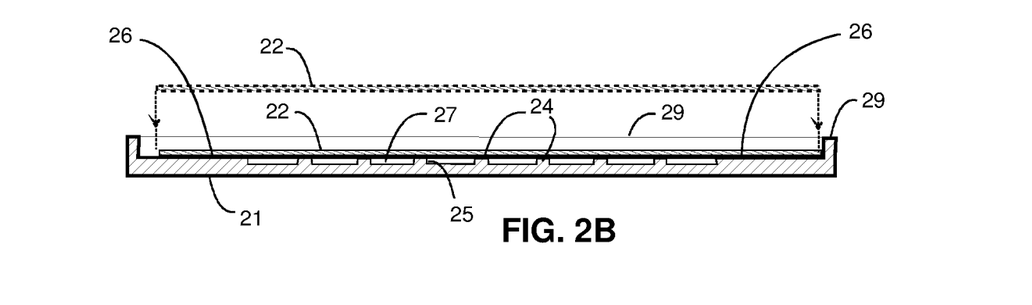
FIG. 2B illustrates an associated cross-sectional view of FIG. 2A taken along line B-B and shows the liquid well molded in the slide base together with the internal ridges and ledges that support the thin coverslip. Variations of this slide assembly can be made to have different well depths to allow microscope observation of larger protozoans or multicellular organisms that may be of interest.

FIGS. 2A and 2B show a plan view and an associated cross-sectional view of the improved microscope slide assembly 20 and the method by which a thinner coverslip 22 can be used to cover the effectively larger liquid well 23. In these figures the well 23 in the slide base 21 is shown to occupy about 30 percent of the area of the slide base 21; an area typically much larger than in well slides representative of the prior art. In this slide assembly 20 the plastic coverslip 22 is prevented from sagging downward into the well 23 by relatively closely spaced ridges 24 having the same height as the depth 25 of the well defined by the ledges 26 around the well 23. Each liquid compartment 27 between the ridges 24 connects to its adjacent compartments 27 via small gaps 28 through the intervening ridges 24. Importantly, the partially continuous barrier characteristics of the ridges 24 constrain the free ranging movements of the live protozoans to remain within the compartment for better microscope observation. The individual liquid compartments 27 bounded by the ridges 24 have a floor area that is about 40 percent of the area of wells representative of typical prior art well slides. Therefore, the liquid spans of the compartments 27 are significantly smaller than those of the wells in prior art well slides. Thus, the plastic coverslip 22 can be made significantly thinner than that required for larger wells.

The slide base 21 shown in FIGS. 2A and 2B has a continuous railing 29 around its perimeter for the purpose of confining the position of the coverslip 22 over the liquid well 23. The railing 29 also provides a convenient outside perimeter by which the assembly 20 can be handled without contacting or disturbing the coverslip 22. The flat surfaces of the ledges 26 are sufficiently wide to allow the objective lens of a microscope to be positioned over the edges of the well 23 without interference by the railings 29 so that protozoans or other objects located close to the side walls of the well 23 can be observed. The coverslip 22 is placed within the railing 29 perimeter and gently pressed down on the ledges 26 surrounding the well 23 and the ridges 24 within the well 23 to close the liquid compartments 27 after being filled with the culture liquid. The excess liquid exiting from under the coverslip 22 forms a thin layer between the ledges 26 and the overlying edges of the coverslip 22 resulting in a capillary attraction holding force that prevents air bubbles from forming in the well 23. Any additional liquid emerging from under the coverslip 22 is removed by an absorbent tissue and all such fugitive liquid is similarly cleaned from the upper surface of the coverslip 22. The width of the rectangular coverslip 22 is only slightly less than the inside width of the perimeter railing 29 so as to hold the coverslip 22 closely fitted within the perimeter railing 29. The length of the rectangular coverslip 22 is slightly shorter than the inside length of the of the perimeter railing 29 to allow convenient access to the edge of the coverslip 22 for the purpose of lifting it out of the perimeter boundary of the slide base 21. Entrapment of air in the well 23 between the slide base 21 and the coverslip 22 is obviated by filling the well 23 with a small excess of the culture liquid to produce a meniscus above the well 23 and then imparting a slight degree of downward convex curvature to the thin and somewhat flexible coverslip 22 as it is emplaced into the recess formed by the slide base 21 and its perimeter railing 29.

Figure 3A:
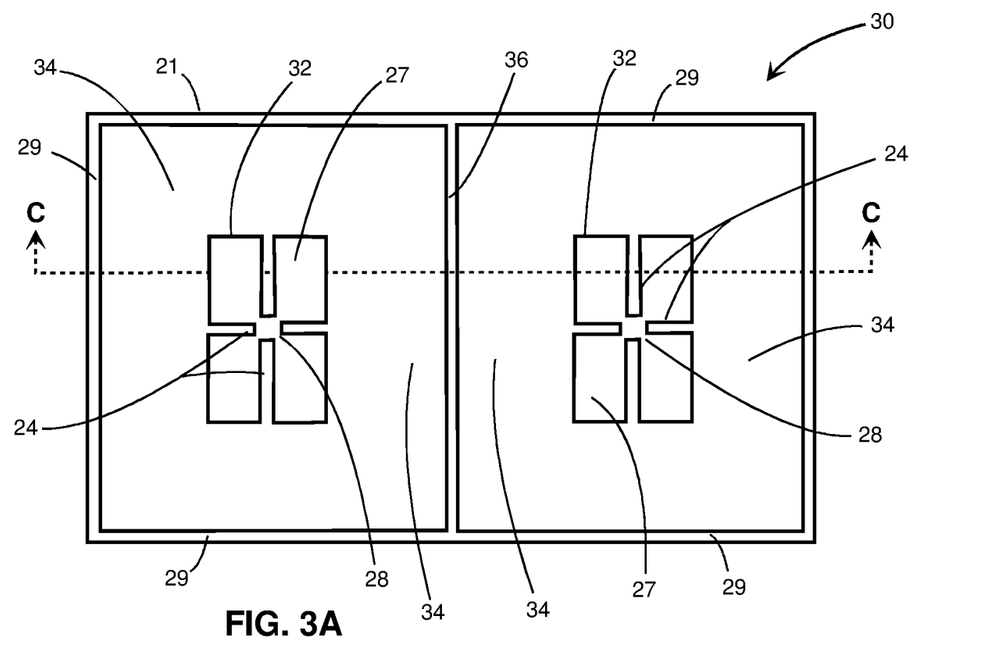
FIG. 3A shows a plan view of a first variation of the liquid-well microscope slide assembly of FIG. 2 in which the well is partitioned into two liquid wells for the purpose of conveniently observing and comparing two different protozoans or other cellular organisms.
Figure 3B:
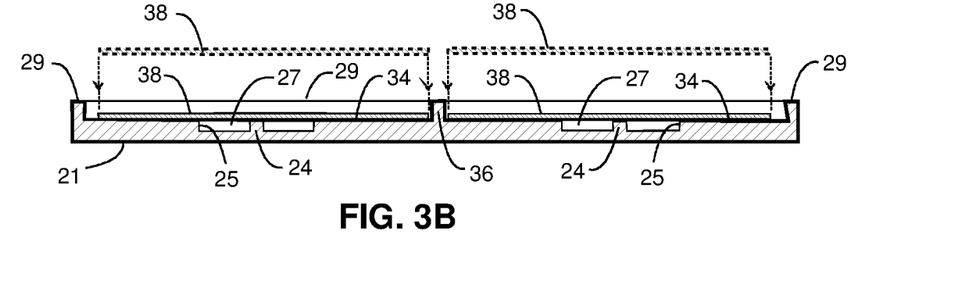
FIG. 3B illustrates an associated cross-sectional view of the assembly of FIG. 3A taken along line C-C.

FIGS. 3A and 3B show a plan view and an associated cross-sectional view of a microscope slide assembly 30 having features similar to those described in reference to the slide assembly 20 shown in FIGS. 2A and 2B but having two separate and independent wells 32 in which two different cultures of protozoans or the like may be conveniently observed and compared in one slide assembly 30 by shifting the position of the assembly 30 on the microscope stage. Many of the features and functions of this two-well slide assembly 30 are essentially the same as those described in detail for the single-well slide assembly shown in FIGS. 2A and 2B. These features and functions are not repeated in reference to the two-well assembly 30 shown in FIGS. 3A and 3B but the elements common to those of FIGS. 2A and 2B are identified by the same numerals used in FIGS. 2A and 2B to indicate and refer to their commonality. The distinctive differences between the two-well slide of FIGS. 3A and 3B and the single-well slide of FIGS. 2A and 2B are the isolation ledges 34, the midline railing 36 separating the two wells 32, and the separate coverslips 38 for covering the wells 32. The isolation ledges 34 and midline railing 36 and the surrounding perimeter boundary railings 29 separate the two independent liquid culture wells 32 having internal ridges 24 with liquid communicating gaps 28. Each of the two wells 32 contains interconnected liquid compartments 27 separated by the internal ridges 24 with liquid communicating gaps 28 and have separate coverslips 38 that are approximately one half the size of the single-cell coverslip 22 shown in FIGS. 2A and 2B. In filling the two-well slide assembly 30 with different protozoan cultures, each well 32 is separately filled, covered by its coverslip 38, and cleaned with an absorbent tissue to remove any excess culture liquid to prevent potential comingling of the two different protozoan cultures placed in the two wells.

Figure 4A:
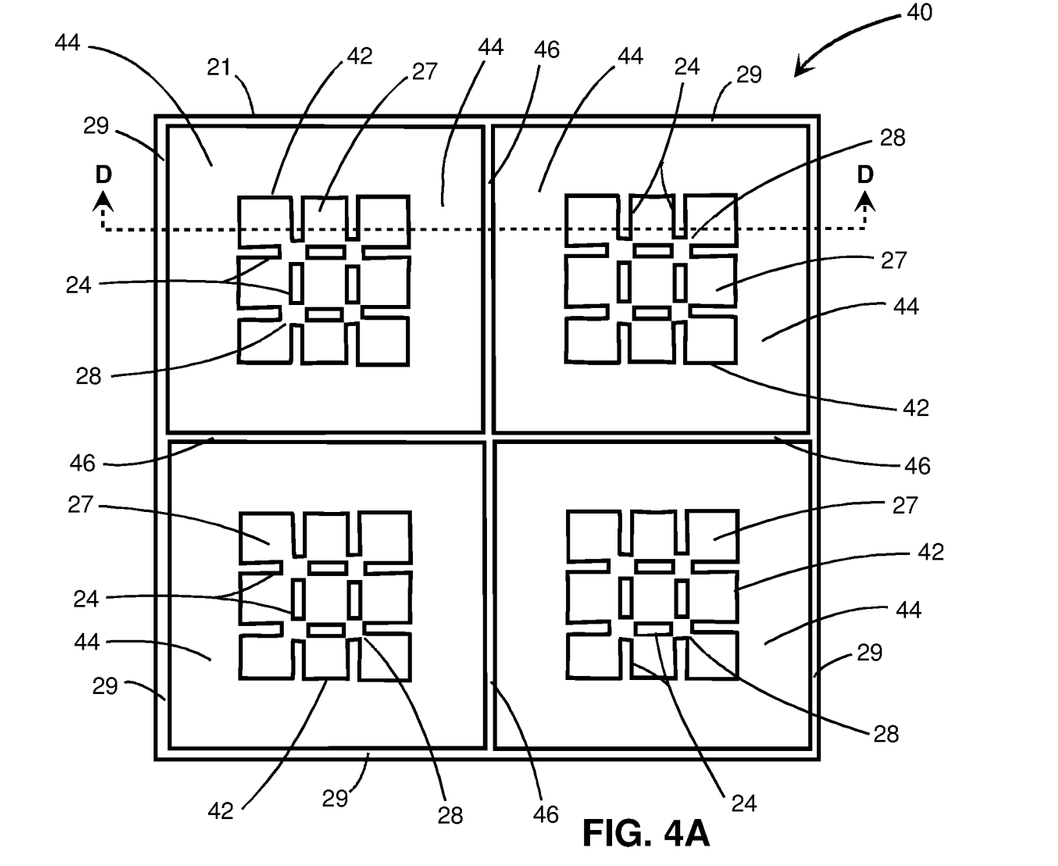
FIG. 4A shows a plan view of a second variation of the liquid-well microscope slide assembly of FIG. 2 in which the well is partitioned into four independent liquid culture wells.
Figure 4B:
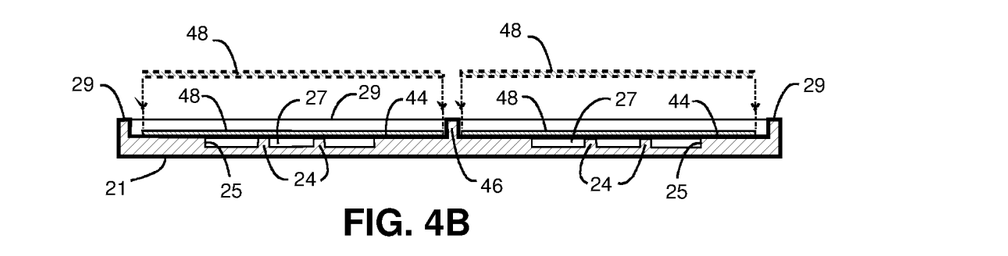
FIG. 4B illustrates an associated cross-sectional view of the assembly of FIG. 4A taken along line D-D.

FIGS. 4A and 4B show a plan view and an associated cross-sectional view of a microscope slide assembly 40 having features similar to those described in reference to the slide assembly shown in FIGS. 3A and 3B but having four separate and independent wells 42 in which four different cultures of protozoans or the like may be conveniently observed and compared. The distinctive differences in FIGS. 4A and 4B relative to FIGS. 2A and 2B and FIGS. 3A and 3B are the isolation ledges 44 around each well 42 and the midline boundary railings 46 and perimeter boundary railings 29 that form independent perimeters around each well 42. Each of the four wells 42 contains interconnected liquid compartments 27 separated by the internal ridges 24 with liquid communicating gaps 28 and have separate coverslips 48 that are approximately one half the size of the single-well coverslip 22 shown in FIGS. 2A and 2B. In this four-well slide assembly 40, the width of the surrounding ledges 44 and the lengths of the ridges 24 are smaller than those shown in FIGS. 2A and 2B to provide wells 42 with a somewhat larger viewing area but without interference between the perimeter railings 46 and the objective lens assembly of the microscope. As explained in reference to FIGS. 3A and 3B, each of the wells of the four-well slide assembly 40 is to be separately filled, covered, and cleaned of excess liquid to avoid comingling the different protozoans being placed in the wells during the slide preparation process.

Figure 5A:
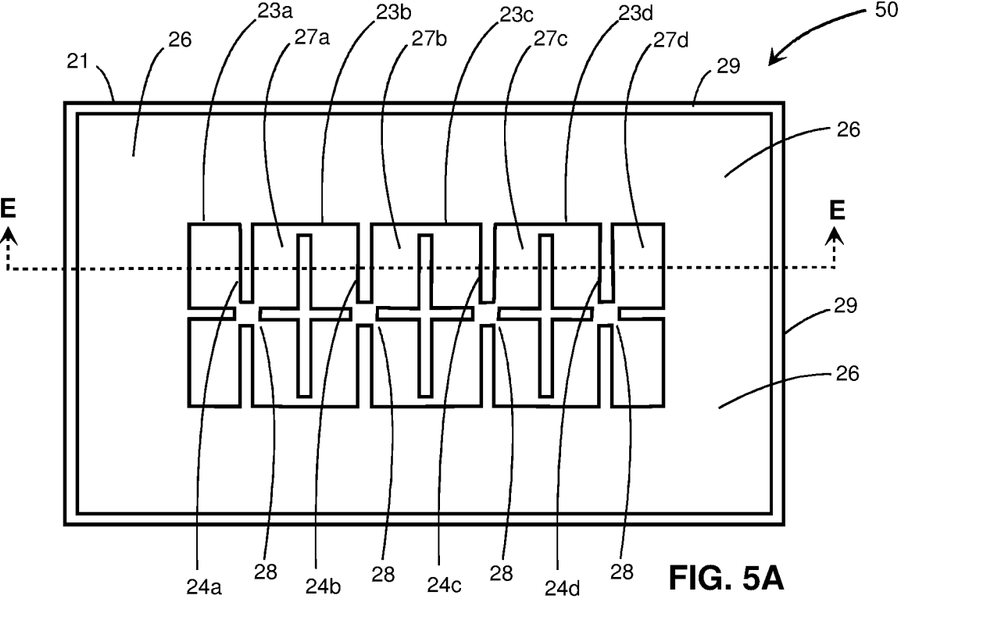
FIG. 5A shows a plan view of a third variation of the liquid-well microscope slide assembly of FIG. 2 in which the well has four sections of different depths separated by narrow ridges having liquid communicating gaps between the liquid compartments formed by the ridges.
Figure 5B:
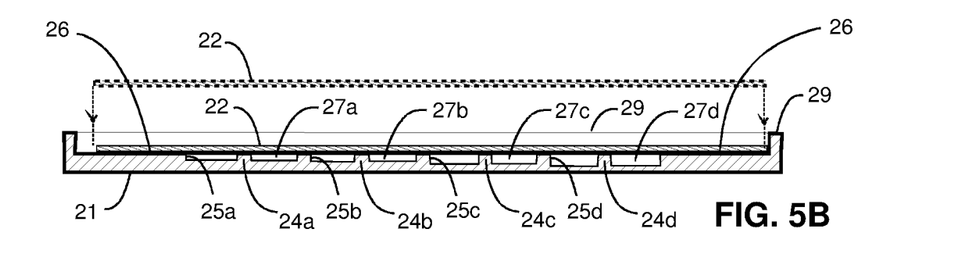
FIG. 5B illustrates an associated cross-sectional view of the assembly of FIG. 5A taken along line E-E.

FIGS. 5A and 5B show a plan view and an associated cross-sectional view of a microscope slide assembly having features similar to those described in reference to the slide assembly shown in FIGS. 2A and 2B but having four different depths in the well 23 with their parts identified and denoted by suffix letters a, b, c, d. This slide assembly 50 allows protozoans of larger but possibly of unknown size to be observed in wells of different depth. The distinctive differences in FIGS. 5A and 5B relative to FIGS. 2A and 2B are the well depths 25a, 25b, 25c, 25d and the heights of the ridges 24a, 24b, 24c, 24d in the four different wells 23a, 23b, 23c, 23d. The ridges 24a, 24b, 24c, 24d in slide base 21 have the same layout as the ridges 24 shown in FIGS. 2A and 2B and the liquid compartments 27a, 27b, 27c, 27d in slide base 21 have the same floor area as the compartments 27 shown in FIGS. 2A and 2B. The liquid communicating gaps 28 in FIGS. 5A and 5B allow the liquid culture to equalize in all of the compartments 27a, 27b, 27c, 27d whereas the ridges 24a, 24b, 24c, 24d serve to support the coverslip 22 over the span of each compartment and to effectively confine the swimming movements of the protozoans therein within each compartment.

As shown in all of the cross-sectional drawings in FIG. 2B through FIG. 5B, the perimeter sides of the slide base 21 extend above the ledges to form a railing 29 to hold the coverslip(s) in place. The interface between the coverslip(s) and the flat surfaces of the ledges holds a thin layer of the culture liquid in which, by surface tension in the liquid, a capillary attraction holding force keeps the coverslip(s) on the ledges to retain the liquid culture in the wells. The depth 25 of the wells is determined by the vertical dimension of the ledges defining the distance from the lower surface of the coverslip(s) to the flat floor of the wells. The internal ridges 24 throughout the wells in each slide assembly have the same vertical dimension as that of the surrounding ledges and, therefore, serve to support the coverslip(s) to provide a uniform well depth over the entire well area.

The dimensions of the microscope slide assembly shown in FIGS. 2A and 2B conform reasonably close to those of standard microscope slides which are 3 inches long by 1 inch wide by 0.04 inch thick as typified in prior art FIGS. 1A and 1B. The standard 3-inch length dimension is preserved in the slide assemblies shown in FIGS. 2A and 2B through FIG. 5 so as to match the standard slide holding arrangements on microscope stages. The width dimension of the slide assembly 20 shown in FIGS. 2A and 2B is typically 1.75 inch. In reference to FIGS. 2A and 2B, this width includes the widths of the perimeter railings 29, the widths of the ledges 26, and the width of the well 23. The well 23 is typically 0.75 inch wide and is centered in the overall width of the slide assembly 20, resulting in ledges having a typical width dimension of 0.46 inch when the width of the railing 29 is typically 0.04 inch. The length of the well 23 is 2 inches and centered in the overall length of the slide assembly 21. The height of the railing 29 above the flat surface of the ledges 26 is typically 0.05 inch and the thickness of the slide base 21 is typically 0.04 inch, resulting in a total height of 0.09 inch for the slide assembly 20. The depth 25 of the well 23 is typically 0.010 inch but may be made with a dimension ranging from 0.008 inch to 0.025 inch (or deeper by using a slide base having a thickness greater than 0.04 inch) to accommodate protozoans of smaller or larger size. The coverslip 22 is typically 0.004 inch thick but may be made with a thickness ranging from about 0.003 inch to 0.015 inch. The thinner coverslip dimension allows protozoans to be observed under higher microscope magnification up to about 400×. The thicker coverslip dimension provides increased coverslip rigidity and easier handling when high magnification is not required. By stating these specific dimensions it is understood that the dimensions of the microscope slide assembly described in this invention are not restricted to those stated but may be made different to accommodate the use of this improved slide assembly configuration with different microscope stages or for observing other sizes of protozoans or multicellular organisms.

The microscope slide assembly described in this invention is made of optically clear plastic material. Examples of such materials include thermoplastic acrylics (polymethyl methacrylate) such as Lucite or Plexiglas, thermosetting polycarbonates such as Lexan or Merlon, and other clear polymer materials. Both of the materials identified above have essentially the same index of refraction and optical transmission efficiency as crown glass whereas acrylics are somewhat harder and more rigid than polycarbonates. Fabrication of the slide base component is accomplished by injection molding whereby the plastic, in melted or liquid form, is injected under pressure into a cavity having the desired shape and dimensions of the slide base component and allowed to solidify through cooling or thermosetting. The coverslip component is made of optically clear plastic material such as Lucite or Plexiglas or Lexan or Merlon materials. The preferred coverslip material is the polycarbonate material such as Lexan because of its desirable rigidity and yet good flexibility and its durable toughness. In a first method of fabrication, the coverslip is cut from a strip of the plastic material having the appropriate intended width and thickness dimensions whereby each coverslip is cut to the intended length dimension. In a second method of fabrication, the coverslip is die cut from a sheet of the plastic material having the intended thickness dimension to yield coverslips of the intended shape and intended length and width dimensions.

The foregoing descriptions refer to specific microscope slide assembly configurations, their component materials, example dimensions, and methods of fabrication to clearly communicate the concepts of the invention. These descriptions exemplifying the practical realization of the invention including certain variations that may broaden its application are not intended to be construed in a limiting sense. On the contrary, various modifications of the disclosed embodiment will become apparent to those skilled in the art upon reference to the descriptions of the invention and, therefore, it is contemplated that the appended claims will cover any and all such modifications, alternatives, and equivalents that fall within the true spirit and scope of the invention.

I claim:

1. A microscope slide assembly for magnified observation and evaluation of live microscopic organisms such as protozoans and other single-cell and multicellular animals or objects contained in a liquid culture medium, said slide assembly comprising:
    a slide base member having a shallow well depression on the upper surface of said slide base for containing said organism culture medium and having provisions for receiving and supporting a cover for closing and retaining said culture medium in said well, said slide base being substantially flat and rectangular in shape;
    a coverslip member removably placeable on said slide base for the purpose of covering and retaining said culture medium in said well; and
    said slide base and coverslip members being made of optically clear material and appropriately sized to fit together with said coverslip supported on an upper surface of said slide base and over a surface area of said well to close said well in a manner that achieves a uniform depth throughout said well, said well having a shallow depth consistent with microscope observation of said microscopic organisms, said microscopic organisms being allowed to move freely within said liquid culture medium in said well, wherein said slide base has a narrow railing around its outer perimeter, said railing rising from the surface of said slide base to form ledges on said upper surface of said slide base, said railing defining an inside upper surface area of said slide base in which said coverslip is placed to cover said well, said coverslip having lateral dimensions that allow it to fit close to said railings around three sides of said rectangular slide base and having a less closer fit on a fourth railing side to allow an edge of said coverslip to be accessed and lifted out of said railing boundary and off of said slide base.

2. The microscope slide assembly of claim 1, wherein said ledges are flat surfaces surrounding said well such that when said coverslip is placed on said flat ledges, the depth of said well is defined by the dimension between a lower surface of said coverslip and a substantially flat bottom surface of said well, said coverslip being a thin sheet of optically clear material of uniform thickness.

3. The microscope slide assembly of claim 1, wherein said well in said slide base has an array of narrow ridges oriented in rectilinear layout and rising from said bottom surface of said well to a height equal to that of said ledges surrounding said well, said ridges providing a means of support of said coverslip over a span area of said well, and said ridges having narrow gaps through which said liquid culture medium resides and communicates freely between the rectangular compartments formed by said ridges, said ridges providing a partially restraining barrier to keep said live protozoans within said liquid culture medium in said rectangular compartments within said well.

4. The microscope slide assembly of claim 1, wherein outside rectangular dimensions of said slide base are 3 inches long by 1.75 inches wide and a thickness dimension of said slide base from said bottom surface to a flat surface of said ledges is 0.04 inch and said shallow well in said slide base is rectangular in shape and has outside dimensions of 2 inches long by 0.75 inch wide and is centered within said outside dimensions of said slide base;
    said well having a depth of 0.010 inch from said flat surface of said ledges to said bottom surface of said well;
    said ridges within said well having a height dimension equal to said well depth of 0.010 inch and a width dimension of 0.04 inch, each said liquid compartment between said ridges having at least one liquid communication gap through surrounding ridge boundaries with adjoining said compartments, said gaps being 0.04 inch wide and;
    said railings forming an upper perimeter of said slide base having a height dimension of 0.05 inch above said flat surface of said ledges and a width dimension of 0.04 inch.

5. The microscope slide assembly of claim 4, wherein said slide base is fabricated by injection molding of liquid-state plastic material, said plastic material being optically clear and of a grade suitable for use as a microscope slide; said injection mold and molding process able to produce finished products having accurately controlled dimensions in regard to said well depth and said ridge height.

6. The microscope slide assembly of claim 4, wherein said plastic material used to injection mold and make said slide base is a thermoplastic acrylic compound such as Lucite or Plexiglas or a thermosetting polycarbonate material such as Lexan or Merlon, wherein said injection molding processes and molding conditions are different for each type of material.

7. The microscope slide assembly of claim 1, wherein said coverslip has substantially rectangular dimensions that fit closely within three sides of said perimeter railings on said slide base and has a thickness of 0.004 inch, said thickness deemed as being relatively thin to give said microscope slide assembly the advantage of allowing said microscopic organisms to be observed under high magnification above 40× and up to about 400×.

8. The microscope slide assembly of claim 1, wherein said well has a depth dimension sufficient to accommodate microscope observation of larger live organisms, said depth having a maximum limit of about 60 percent to about 70 percent of said slide base thickness between said flat surface of said ledges on said slide base and said bottom surface of said slide base.

9. The microscope slide assembly of claim 1, wherein said well in said slide base is subdivided into two or more adjacent but separate and independent liquid culture confining wells for purposes of observing and comparing two or more said microscopic organisms by shifting position of said microscope slide assembly on a microscope stage, said separate wells having appropriate features similar to those of a single-well slide base including ledges, ridges, and railings; and further, including separate coverslips and a means for emplacing said separate coverslips dimensioned to properly fit into said railing boundaries of each said separate cell.

10. The microscope slide assembly of claim 9 wherein said well in said slide base has at least two different depths along a length, said different well depths separated by said ridges having liquid communicating gaps and said ridges forming liquid compartments within said wells of different depths, said different depths defined by the distances from a top flat surface of bounding ledges to a bottom surface of each said well of different depth.

11. The microscope slide assembly of claim 1, wherein said coverslip is made of plastic material suitable for use as a microscope slide cover when viewing and evaluating said microscopic organisms.

* * * * *